(12) United States Patent
Fujita

(10) Patent No.: US 6,219,588 B1
(45) Date of Patent: Apr. 17, 2001

(54) ROBOT APPARATUS

(75) Inventor: Masahiro Fujita, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/009,684

(22) Filed: Jan. 20, 1998

(30) Foreign Application Priority Data

Jan. 23, 1997 (JP) .................................................. 9-024405

(51) Int. Cl.$^7$ .................................................. G06F 19/00
(52) U.S. Cl. .................................... 700/245; 318/568.12
(58) Field of Search .................................. 700/245, 246, 700/247, 248, 249, 250, 251, 252, 253, 254, 255, 256, 257, 258, 259, 260, 261, 262, 263, 264; 318/568.11–568.18; 901/8

(56) References Cited

U.S. PATENT DOCUMENTS

| | | | |
|---|---|---|---|
| 5,642,467 | * 6/1997 | Stover et al. | 700/250 |
| 5,697,829 | * 12/1997 | Chainani et al. | 446/436 |
| 5,739,655 | * 4/1998 | Torii et al. | 318/568.12 |
| 5,832,189 | * 11/1998 | Tow | 700/259 |
| 5,870,527 | * 2/1999 | Fujikawa et al. | 700/245 |

OTHER PUBLICATIONS

Hartikainen K. K. et al: "Mecant I: A Six Legged Walking Machine for Research Purposes in Outdoor Environment" Proceedings of the International Conference on Robotics and Automat, Nice, May 12–14, 1992, vol. 1, No. Conf. 8, May 1992, pp. 157–163, Institute of Electrical and Electronics Engineers.

Bihari T. E. et al: "Controlling the Adaptive Suspension Vehicle" Computer, vol. 22, No. Jun. 1989, pp. 59–64.

Rodney A. Brooks: "A Layered Intelligent Control System for a Mobile Robot" 1988, Robotics Research, The Third International Symposium, Edited by O. D. Faugeras and Georges Giralt, the MIT Press Cambridge, Massachusettes London, England.

* cited by examiner

Primary Examiner—William Grant
Assistant Examiner—Zoila Cabrera
(74) Attorney, Agent, or Firm—Frommer Lawrence & Haug, LLP.; William S. Frommer; Glenn F. Savit

(57) ABSTRACT

A robot apparatus including a mechanical system having at least one mechanical portion arranged to be operated by a drive portion; a mechanical-system-command converter arranged to receive a command which is independent from a mechanical system and which does not depend on the mechanical system to convert the command independent from the mechanical system into a command depending on the mechanical system and adaptable to the mechanical system; and a control portion for controlling the operation of the drive portion in accordance with the command depending on the mechanical system supplied from the mechanical-system-command converter.

10 Claims, 16 Drawing Sheets standing walking pattern sleeping laughing sitting

ROBOT APPARATUS

BACKGROUND OF THE INVENTION

1. Field of the Invention

The present invention relates to a robot apparatus of various forms having mechanical systems of different types arranged to use a command, which is independent from a mechanical system and which does not depend on the mechanical system, and enabled to be controlled by a common control system and to a control method therefor.

2. Description of Prior Art

Hitherto, a variety of robot apparatuses have been disclosed which include tired-robots capable of self-running by dint of the tires, and bipedal or quadrapedal walking robots, each of the foregoing robot apparatuses having various mechanical systems.

A robot apparatus of the foregoing type has a mechanical system in which actuators each having a predetermined degree of freedom and sensors for each detecting a predetermined physical quantity are disposed at predetermined positions. A control unit having a microcomputer individually operates the various actuators in accordance with outputs from the sensors and the control program. Thus, the self-running operation of the robot apparatus is permitted. Moreover, the robot apparatus performs a predetermined operation. The above-mentioned robot apparatus is assembled into a predetermined form in such a manner that various component units including a body, legs and a head maintain predetermined relative positions.

When a variety of robot apparatuses each having various mechanical systems are controlled, each robot apparatus must be controlled by using commands defined to correspond to the mechanical systems of the apparatus. It leads to a fact that a control program for each of the various robots each having different mechanical systems must be prepared even if a common operation, such as moving forwards, moving backward or stoppage, is performed.

OBJECT AND SUMMARY OF THE INVENTION

Accordingly, an object of the present invention is to provide a robot apparatus of various forms having mechanical systems of different types arranged to use a command, which is independent from a mechanical system and which does not depend on the mechanical system, and enabled to be controlled by a common control system and to a control method therefor.

According to one aspect of the present invention, there is provided a robot apparatus including: a mechanical system having at least one mechanical portion arranged to be operated by a drive portion; a mechanical-system-command converter arranged to receive a command which is independent from a mechanical system and which does not depend on the mechanical system to convert the command independent from the mechanical system into a command depending on the mechanical system and adaptable to the mechanical system; and a control portion for controlling the operation of the drive portion in accordance with the command depending on the mechanical system supplied from the mechanical-system-command converter.

According to another aspect of the present invention, there is provided a method of controlling a robot apparatus including a mechanical system having at least one mechanical portion arranged to be operated by a drive portion, the method including the steps of: converting a command which is independent from a mechanical system and which does not depend on the mechanical system into a command depending on the mechanical system adapted to the mechanical system; and controlling the drive portion in accordance with the command depending on the mechanical system.

Other objects, features and advantages of the invention will be evident from the following detailed description of the preferred embodiments described in conjunction with the attached drawings.

DETAILED DESCRIPTION OF THE INVENTION

An embodiment of the present invention will now be described with reference to the drawings.

Figure 1:
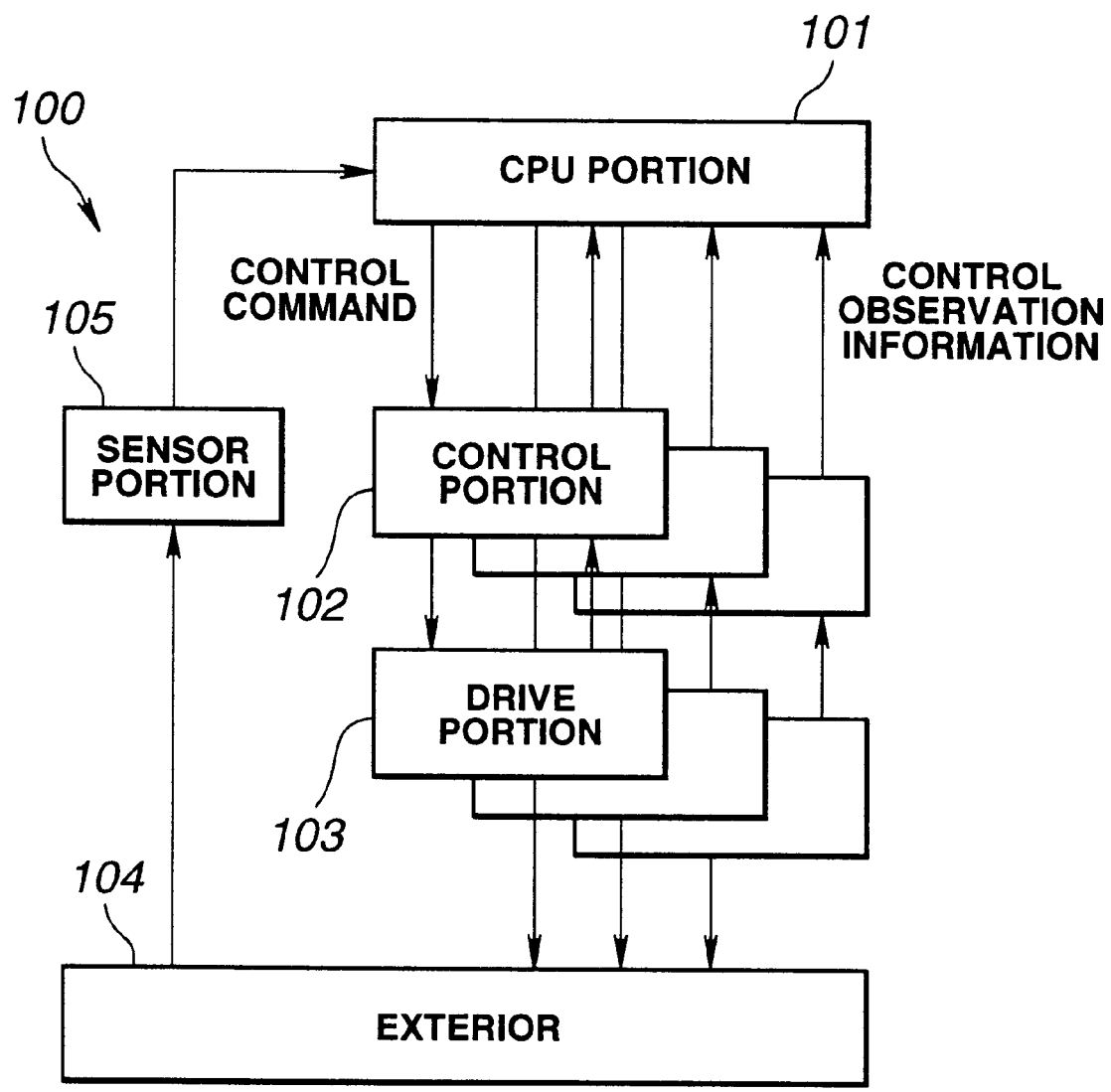
FIG. 1 is a block diagram showing the basic structure of a robot apparatus according to the present invention.

FIG. 1 is a block diagram showing the basic structure of a robot apparatus 100 according to the present invention.

The robot apparatus 100 includes a CPU (Central Processing Unit) portion 101, a control portion 102, a drive portion 103, an exterior 104 and a sensor portion 105.

The CPU portion 101 is composed of a CPU (Central Processing Unit) and peripheral circuit elements including memories. The CPU portion 101 converts a command which is independent from a mechanical system and which does not depend on the mechanical system into a command depending on the mechanical system so as to supply a control command to the control portion 102. A plurality of the control portions 102 and drive portions 103 form pairs so that one control portion 102 controls one drive portion 103. The control portion 102 receives a value detected by the sensor portion 105 arranged to detect a predetermined physical quantity, such as the position of the mechanical system forming the exterior 104 of the robot apparatus 100 so as to control the drive portion 103. The drive portion 103 drives the mechanical system which forms the exterior 104. The sensor portion 105 causes the robot apparatus 100 to perform an autonomous operation, the sensor portion 105 having a potentiometer for detecting the position of the mechanical system.

The structure of the CPU portion 101 of the robot apparatus 100 in terms of software will now be described with reference to FIG. 2.

The software processing portion of the CPU portion 101 is composed of a sensor processing portion 111, an automaton portion 112 and a mechanical-system-command converter 113.

The sensor processing portion 111 includes, as input devices, a timer, an obstacle sensor and a sound sensor. The timer measures time in units of milliseconds. If certain time is set to the timer, the timer is turned off. If the set time has elapsed, the timer is turned on. To simplify the description, the obstacle sensor includes a front obstacle sensor, right obstacle sensor and a left obstacle sensor disposed in the front portion of the apparatus, on the left side of the same and on the right side of the same, respectively. When the obstacle sensor is brought into contact with an obstacle, the obstacle sensor is turned on. The sound sensor receives sound through a microphone to detect the sound level. If the sound level exceeds a predetermined level, the sound sensor is turned on.

A procedure for determining a state transition rule for the automaton portion 112 is arranged to follow a flow chart shown in FIGS. 3 to 6. The automaton portion 112 performs state transition and transmits, to a mechanical-system-command converter 113 which is a next software module, a command independent from the mechanical system as described above when a certain state is shifted to another state. Data transmitted from the automaton portion 112 is composed of data expressed by a character string and a parameter attached to a command as an option.

Figure 3:
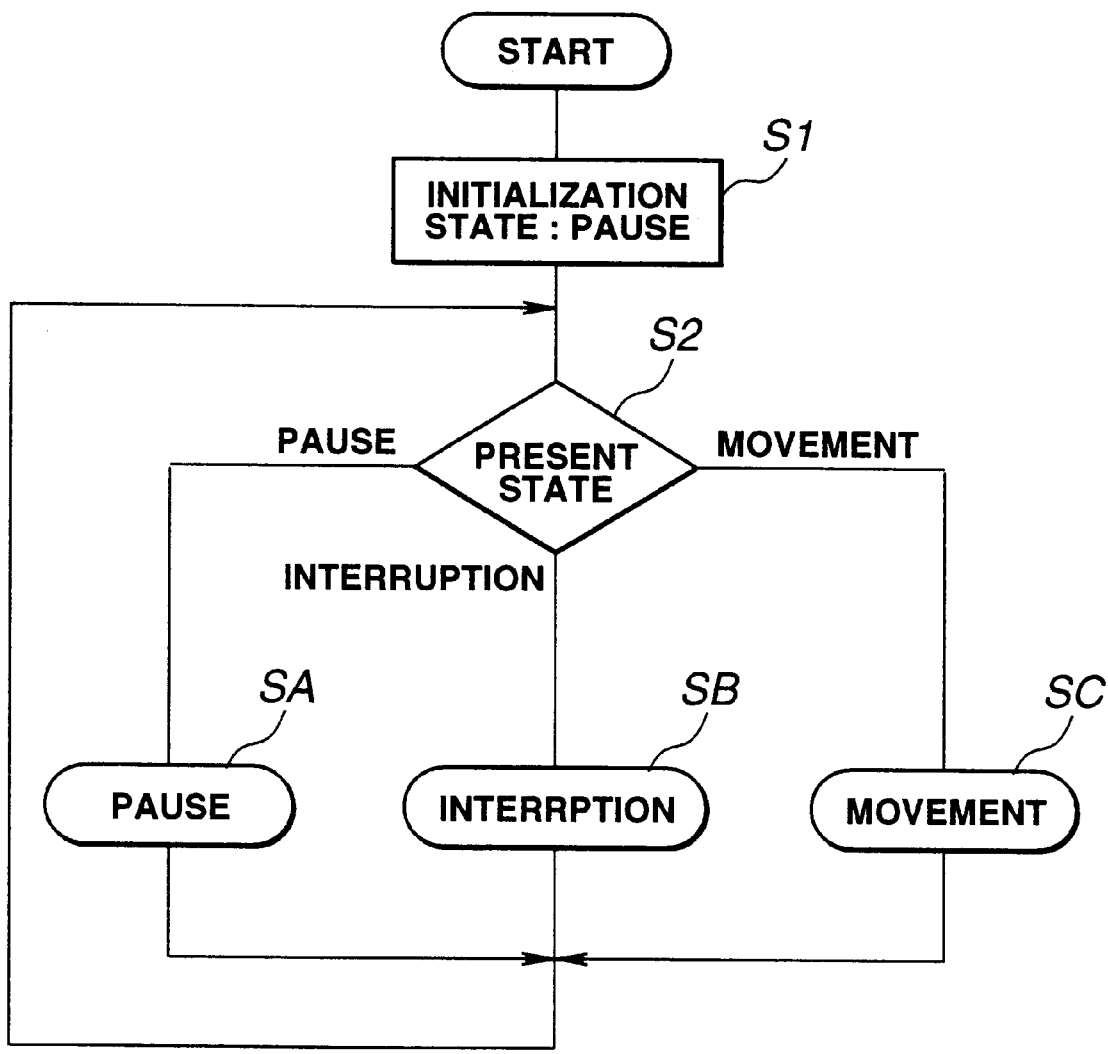
FIG. 3 is a flow chart of a procedure for determining a state transition rule for an automaton portion of the robot apparatus.

The command independent from the mechanical system according to this embodiment has the following types of commands:

(1) standing
(2) move (parameter angle [deg])
(3) sleeping
(4) hello
(5) laughing In accordance with the flow chart shown in FIG. 3, the automaton portion 112 initially performs initialization in step S1 after the process has been started. Thus, state "pause" is realized, and then the operation proceeds to step S2 so that the present state is determined. In accordance with a result of the determination performed in step S2, step SA or SB or SC in the present state and step S2 are repeated so that the state is shifted. As a result, step SA "pause", step SB "interruption" and step SC "shift" are performed.

Figure 4:
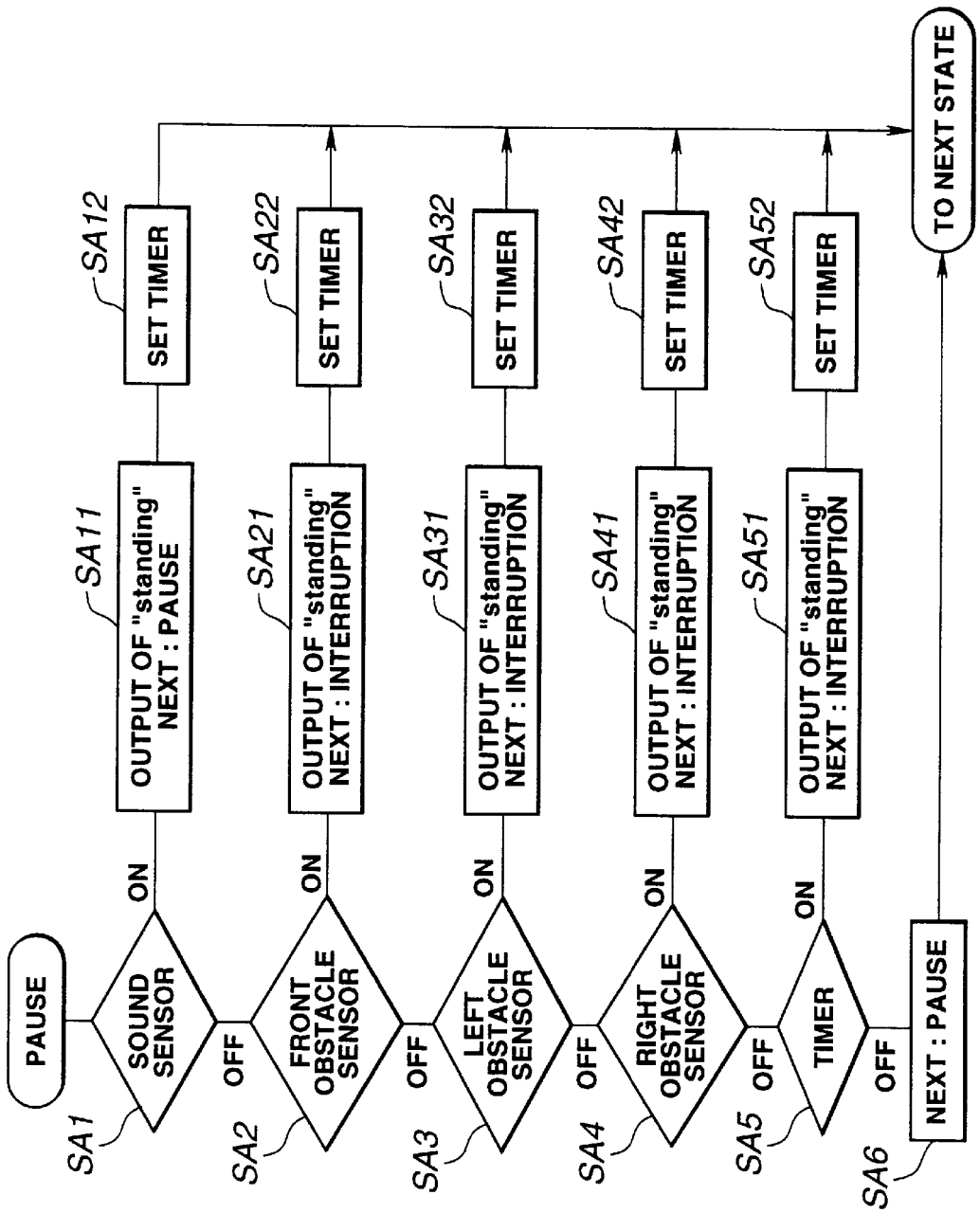
FIG. 4 is a flow chart of a procedure for a process "pause" in the procedure for determining the state transition rule in the automaton portion.

In step SA "pause", step SA1 is performed so that a determination is made whether the sound sensor has been turned on or off, as shown in FIG. 4. If the sound sensor is turned off, step SA2 is performed to determine whether the front obstacle sensor is turned on or off. If the front obstacle sensor is turned off, step SA3 is performed to determine whether the left obstacle sensor is turned on or off. If the left obstacle sensor is turned off, step SA4 is performed to determine whether the right obstacle sensor is turned on or off. If the right obstacle sensor is turned off, step SA5 is performed to determine whether the timer is turned on or off. If the timer is turned off, step SA6 is performed so that a next state is set to be "pause". Then, the state is shifted to a next state.

In the step SA "pause", step SA11 is performed if the sound sensor is turned on in step SA1 so that command "standing" which is a command independent from the mechanical system is output and the next state is set to be pause. Then, step SA12 is performed so that the timer is set, and then the state is shifted to a next state. If the front obstacle sensor is turned on in step SA2, step SA21 is performed so that command "standing" which is a command independent from the mechanical system is output and the next state is set to be "interruption". Moreover, step SA22 for setting the timer is performed. Then, the state is shifted to a next state. If the left obstacle sensor is turned on in step SA3, step SA31 for outputting command "standing" which is a command independent from the mechanical system and setting the next state to be "interruption" is performed. Moreover, step SA32 for setting the timer is performed, and then the state is shifted to a next state. If the right obstacle sensor is turned on in step SA4, step SA41 is performed so that command "standing" which is a command independent from the mechanical system is output and the next state is set to be "interruption". Moreover, step SA42 for setting the timer is performed. Then, the state is shifted to a next state. If the timer is turned on in step SA5, step SA51 is performed so that command "standing" which is a command independent from the mechanical system is output and the next state is set to be "interruption". Then, step SA52 is performed so that the timer is set. Then, the state is shifted to a next state.

Figure 5:
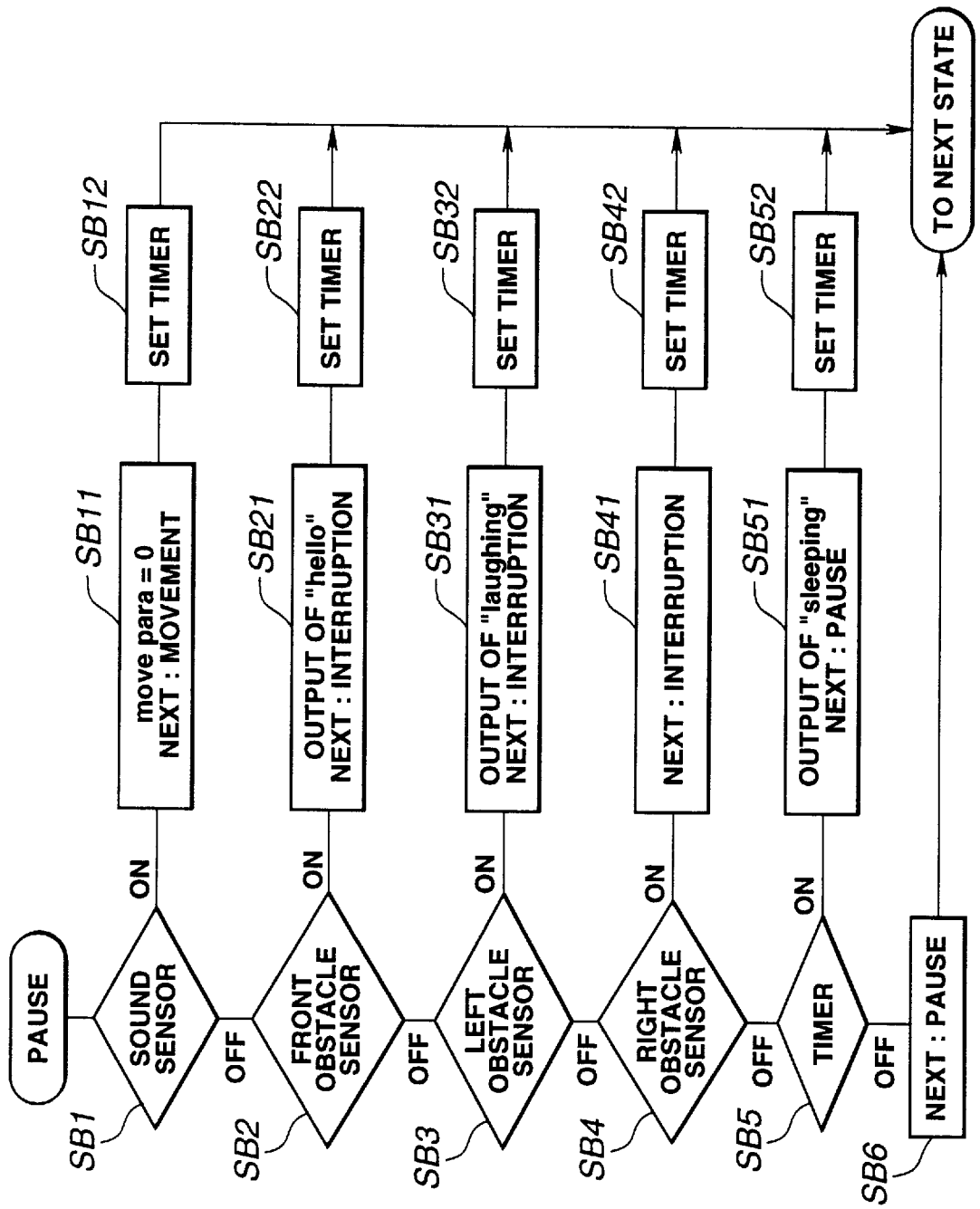
FIG. 5 is a flow chart of a procedure for a process "interruption" in the procedure for determining the state transition rule in the automaton portion.

In step SB "interruption", step SB1 is performed so that whether the sound sensor is turned on or off is determined, as shown in FIG. 5. If the sound sensor is turned off, step SB2 is performed so that whether the front obstacle sensor is turned on or off is determined. If the front obstacle sensor is turned off, step SB3 is performed so that whether the left obstacle sensor is turned on or off is performed. If the left obstacle sensor is turned off, step SB4 is performed so that whether the right obstacle sensor is turned on or off is determined. If the right obstacle sensor is turned off, step SB5 is performed so that whether the timer is turned on or off is determined. If the timer is turned off, step SB6 is performed so that the next state is set to be "interruption". Then, the state is shifted to a next state.

In step SB "interruption, step SB11 is performed if the sound sensor is turned on in step SB1 so that command "move (parameter angle [0 deg]" which is a command independent from the mechanical system is output and the next state is set to be "movement". Moreover, step SB12 for setting the timer is performed, and then the state is shifted to a next state. If the front obstacle sensor is turned on in step SB2, step SB21 is performed so that command "hello" which is a command independent from the mechanical system is output and the next state is set to be "interruption". Then, step SB22 for setting the timer is performed, and then the state is shifted to a next state. If the left obstacle sensor is turned on in step SB3, step SB31 is performed so that command "laughing" which is a command independent from the mechanical system is output and the next state is set to be "interruption". Moreover, step SB32 for setting the timer is performed, and then the state is shifted to a next state. If the right obstacle sensor is turned on in step SB4, step SB41 is performed so that the next state is set to be "interruption". Moreover, step SB42 for setting the timer is performed, and then the state is shifted to a next state. If the timer is turned on in step SB5, step SB51 is performed so that command "sleeping" which is a command independent from the mechanical system is output and the next state is set to be "pause". Moreover, step SB52 for setting the timer is performed, and then the state is shifted to a next state.

Figure 6:
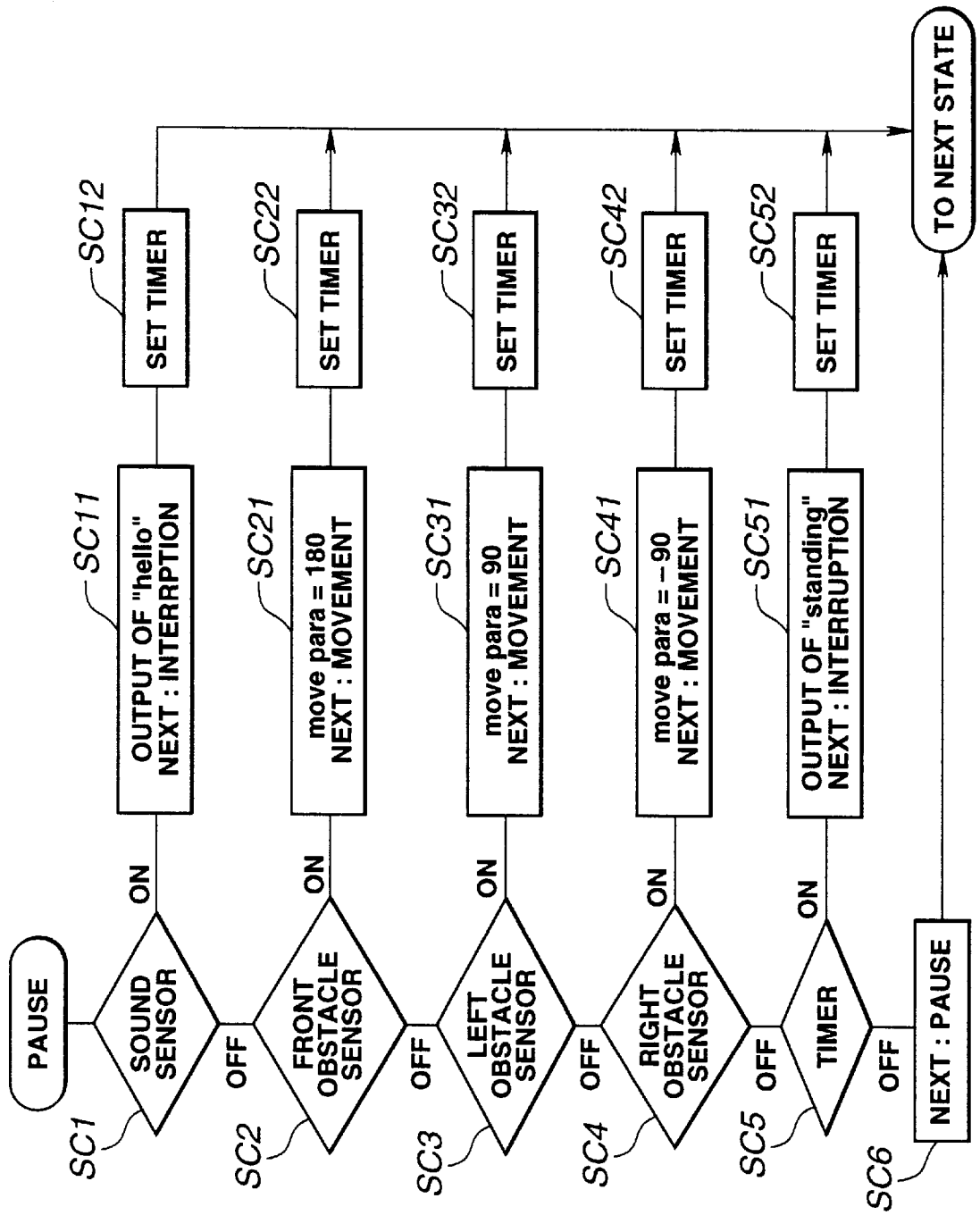
FIG. 6 is a flow chart of a procedure for a process "movement" in the procedure for determining the state transition rule in the automaton portion.

In step SC "movement", step SC1 for determining whether the sound sensor is turned on or off is performed, as shown in FIG. 6. If the sound sensor is turned off, step SC2 for determining whether the front obstacle sensor is turned on or off is performed. If the front obstacle sensor is turned off, step SC3 is performed so that whether the left obstacle sensor is turned on or off is determined. If the left obstacle sensor is turned off, step SC4 is performed so that whether the right obstacle sensor is turned on or off is determined. If the right obstacle sensor is turned off, step SC5 is performed so that whether the timer is turned on or off is determined. If the timer is turned off, step SC6 for setting the next state to be pause is performed. Then, the state is shifted to a next state.

In step SC "movement", step SC11 is performed if the sound sensor is turned on in step SC1 so that command "hello" which is a command independent from the mechanical system is output and the next state is set to be "interruption". Moreover, step SC12 for setting the timer is performed, and then the state is shifted to a next state. If the front obstacle sensor is turned on in step SC2, step SC21 is performed so that command "move (parameter angle [180 deg]" which is a command independent from the mechanical system is output and the next state is shifted to be "movement". Moreover, step SC22 for setting the timer is performed, and then the state is shifted to a next state. If the left obstacle sensor is turned on in step SC3, step SC31 is performed so that command "move (parameter angle [90 deg]" which is a command independent from the mechanical system is output and the next state is set to be "movement". Moreover, step SC32 for setting the timer is performed, and then the state is shifted to a next state. If the right obstacle sensor is turned on in step SC4, step SC41 is performed so that command "move (parameter angle [–90 deg]" which is a command independent from the mechanical system is output and the next state is set to be "movement". Moreover, step SC42 for setting the timer is performed, and then the state is shifted to a next state. If the timer is turned on in step SC5, step SC51 is performed so that command "standing" which is a command independent from the mechanical system is output and the next state is set to be "interruption". Then, step SC52 for setting the timer is performed, and then the state is shifted to a next state.

The mechanical-system-command converter 113 converts the command independent from the mechanical system output from the automaton portion 112 into a command depending on the mechanical system which forms the exterior 104. Then, the mechanical-system-command converter 113 supplies the command depending on the mechanical system to the control portion 102.

As described above, the structure according to this embodiment has the mechanical-system-command converter 113 for converting the command independent from the mechanical system into the command depending on the mechanical system. When movement is commanded with a command "move (parameter angle [deg]" which is a command independent from the mechanical system, the foregoing command is converted into a movement command which instructs the direction of rotation of the drive wheels of, for example, a tired-robot. Thus, the movement command can be executed. In a case of a quadrapedal walking robot, the foregoing command is converted into a movement command for moving the legs in accordance with walking patters. Thus, the movement command can be executed. The command "hello" which is a command independent from the mechanical system is converted into a command corresponding to an operation for clockwise rotating three times on the spot in the case of the tired-robot. In the case of the quadrapedal walking robot, the foregoing command is converted into a command corresponding to, for example, an operation that the front-right leg is raised and swung horizontally in a state where the quadrapedal walking robot is sit down. Thus, the command "hello" which is a command independent from the mechanical system can be executed by both types of the foregoing robots. As described above, the same command can be made to correspond to different actions among mechanical systems. That is, the mechanical-system-command converter 113 enables higher-order software to be used as a source code or a binary level. Therefore, use of software as part can be enhanced and software in a portion which does not depend on the mechanical system can be reused. As a result, development of software can efficiently be performed.

Figure 7:
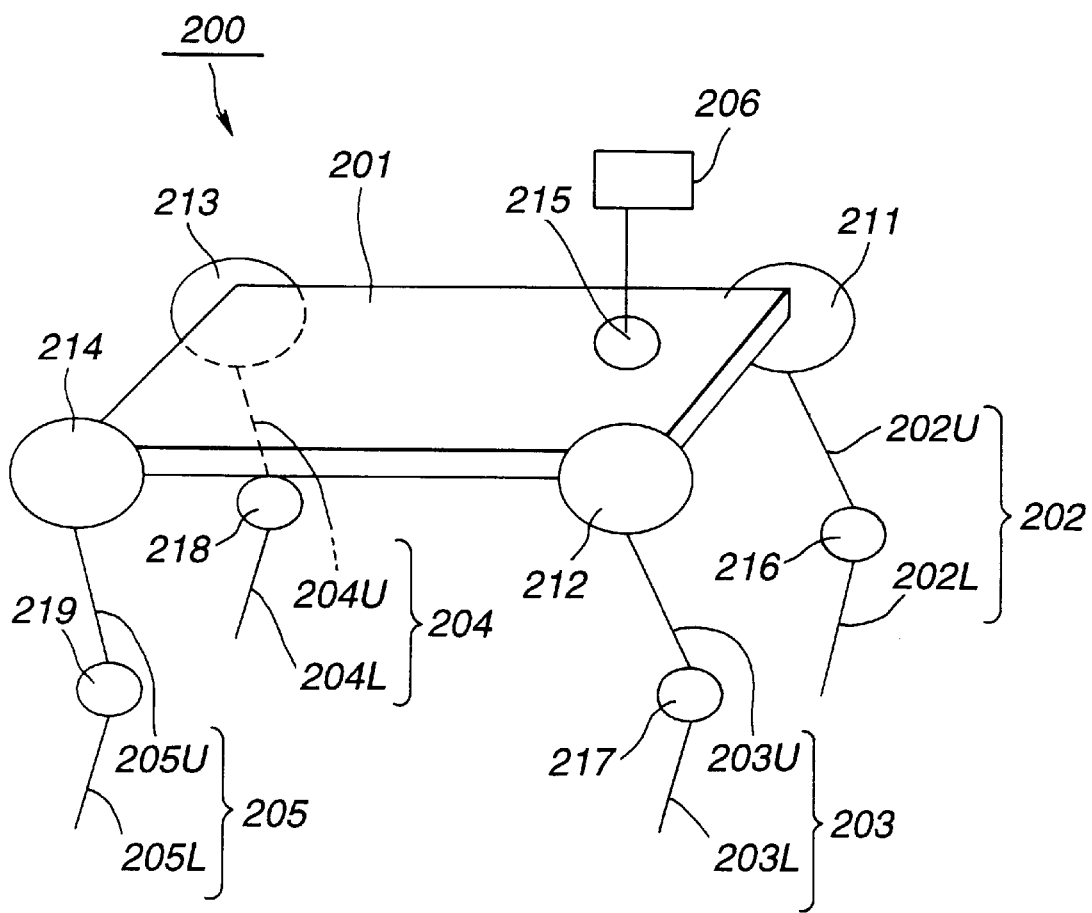
FIG. 7 is a diagram schematically showing the basic structure of a mechanical system forming an exterior of a self-standing and quadrapedal walking robot according to the present invention.

FIG. 7 is a schematic view showing the basic structure of a mechanical system forming the exterior of a self-running robot apparatus 200 according to the present invention.

The self-running robot apparatus 200 is a quadrapedal and self-running robot having a multiplicity of joints. The self-running robot apparatus 200 has a structure that a front-right leg 202, a front-left leg 203, a rear-right leg 204, a rear-left leg 205 and a neck 206 are connected to a body 201 through joints 211, 212, 213, 214 and 215.

The front-right leg 202 is connected to the body 201 through the joint 211 corresponding to the shoulder joint. The front-right leg 202 has a function of extending the legs and a function of turning to and fro when two servo motors (not shown) provided for the joint 211 to serve as actuators are rotated. The front-right leg 202 is composed of an upper portion 202U of the front-right leg 202 and a lower portion 202L of the front-right leg 202 connected to each other through a joint 216 corresponding to the knee. When a servo motor (not shown) provided for the joint 216 and serving as an actuator is rotated, the lower portion 202L of the front-right leg 202 can be rotated to and fro.

The front-left leg 203 is connected to the body 201 through the joint 212 corresponding to the shoulder joint. The front-left leg 203 has a function of extending the leg and a function of turning to and fro when two servo motors (not shown) provided for the joint 212 to serve as actuators are rotated. The front-left leg 203 is composed of an upper portion 203U of the front-left leg 203 and a lower portion 203L of the front-left leg 203 connected to each other through a joint 217 corresponding to the knee. When a servo motor (not shown) provided for the joint 217 and serving as an actuator is rotated, the lower portion 203L of the front-left leg 203 can be rotated to and fro.

The rear-right leg 204 is connected to the body 201 through the joint 213 corresponding to the hip joint. The rear-right leg 204 has a function of rotating to and fro when a servo motor serving as an actuator and provided for the joint 213 is rotated. The rear-right leg 204 is composed of an upper portion 204U of the rear-right leg 204 and the lower portion 204L of the rear-right leg 204 connected to each other through a joint 218 corresponding to the knee. When a servo motor (not shown) provided for the joint 218 and serving as an actuator is rotated, the lower portion 204L of the rear-right leg 204 can be rotated to and fro.

The rear-left leg 205 is connected to the body 201 through the joint 214 corresponding to the hip joint. When a servo motor provided for the joint 214 and serving as an actuator is rotated, the rear-left leg 205 is rotated to and fro. The rear-left leg 205 is composed of an upper portion 205U of the rear-left leg 205 and a lower portion 205L of the rear-left leg 205 connected to each other through a joint 219 corresponding to the knee. When a servo motor provided for the joint 219 and serving as an actuator is rotated, the lower portion 205L of the rear-left leg 205 can be rotated to and fro.

The neck 206 is connected to the body 201 through the joint 215 corresponding to a neck joint. When two servo motors provided for the joint 215 and serving as actuators are rotated, the neck 206 is able to rotate vertically and laterally.

Figure 2:
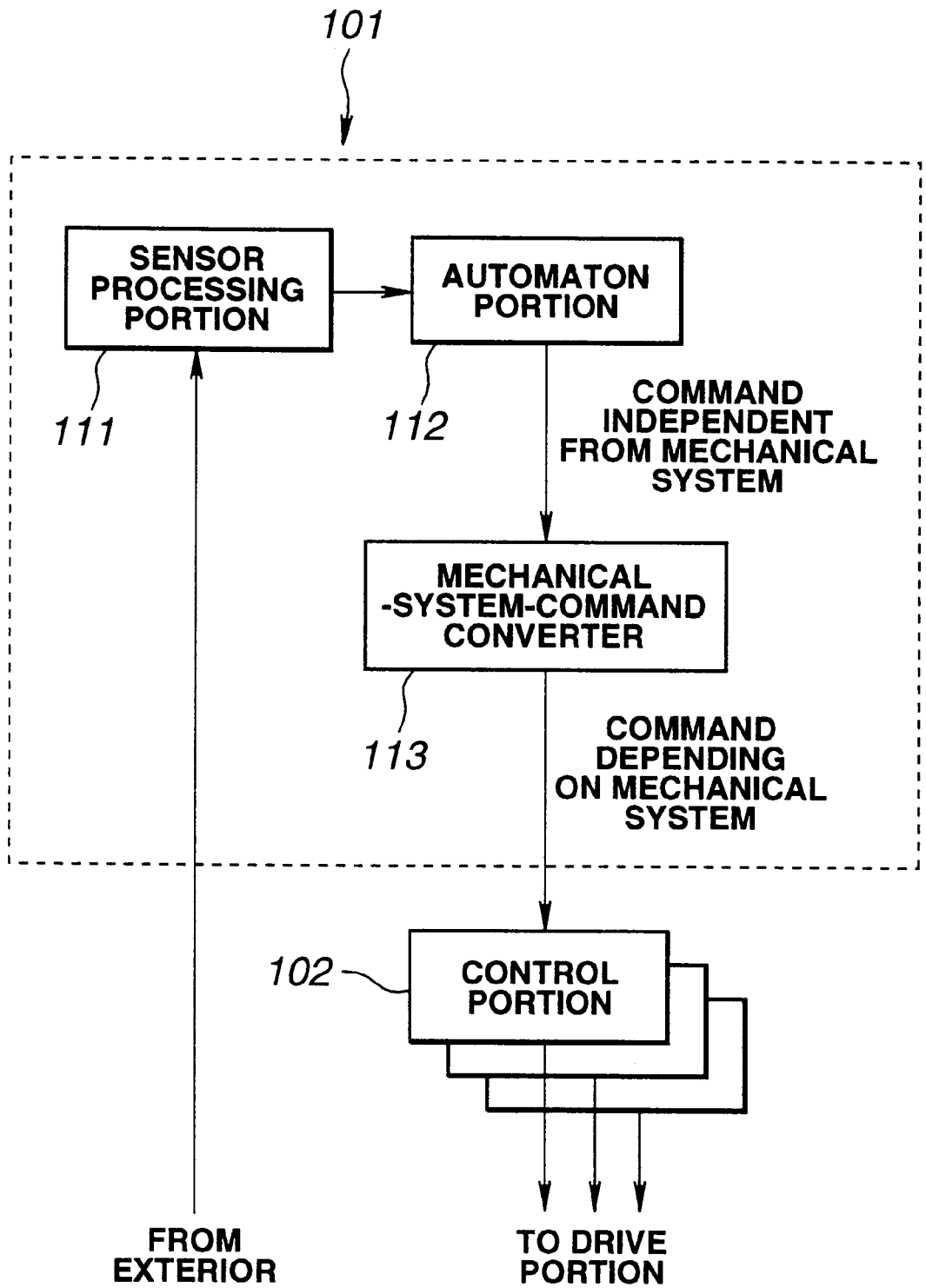
FIG. 2 is a diagram showing the structure of a CPU portion of the robot apparatus in terms of software.

The self-running robot apparatus 200 has a structure that a mechanical-system-command converter provided for the CPU portion 101 having the structure in terms of software shown in FIG. 2 converts a command which is independent from the mechanical system and which does not depend on the mechanical system into a command depending on the mechanical system. Thus, the following control commands are supplied to the control portion 102.

Figure 8:
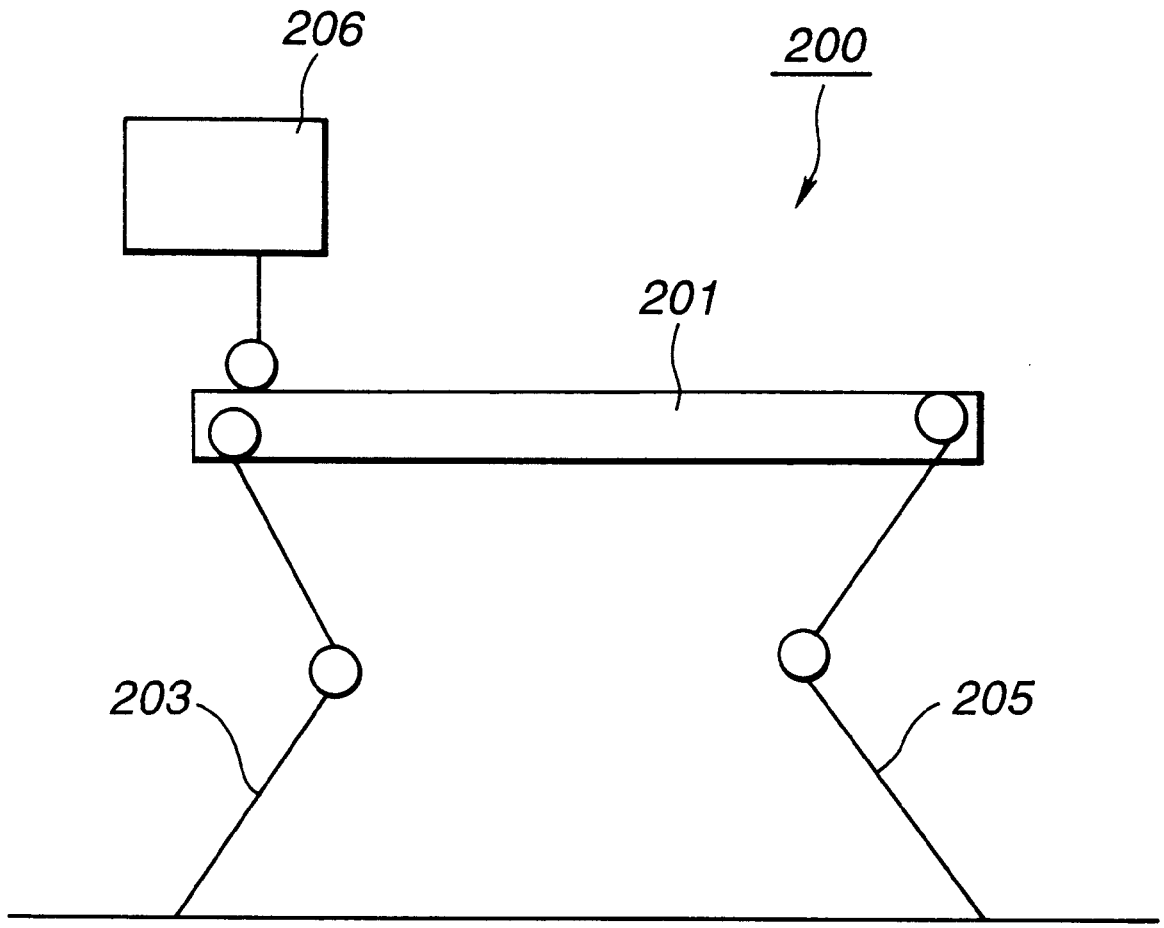
FIG. 8 is a schematic view showing attitude "standing" of the self-standing and quadrapedal walking robot.

That is, command "standing" which is a command independent from the mechanical system is converted into a control command in the form of an attitude transition string to realize attitude "standing". The control portion 102 follows the foregoing control command to rotate the servo motor of the drive portion 103 to perform shifting to attitude "standing" so that the self-running robot apparatus 200 stands with the four legs which are the front-right leg 202, the front-left leg 203, the rear-right leg 204 and the rear-left leg 205, as shown in FIG. 8.

Figure 9:
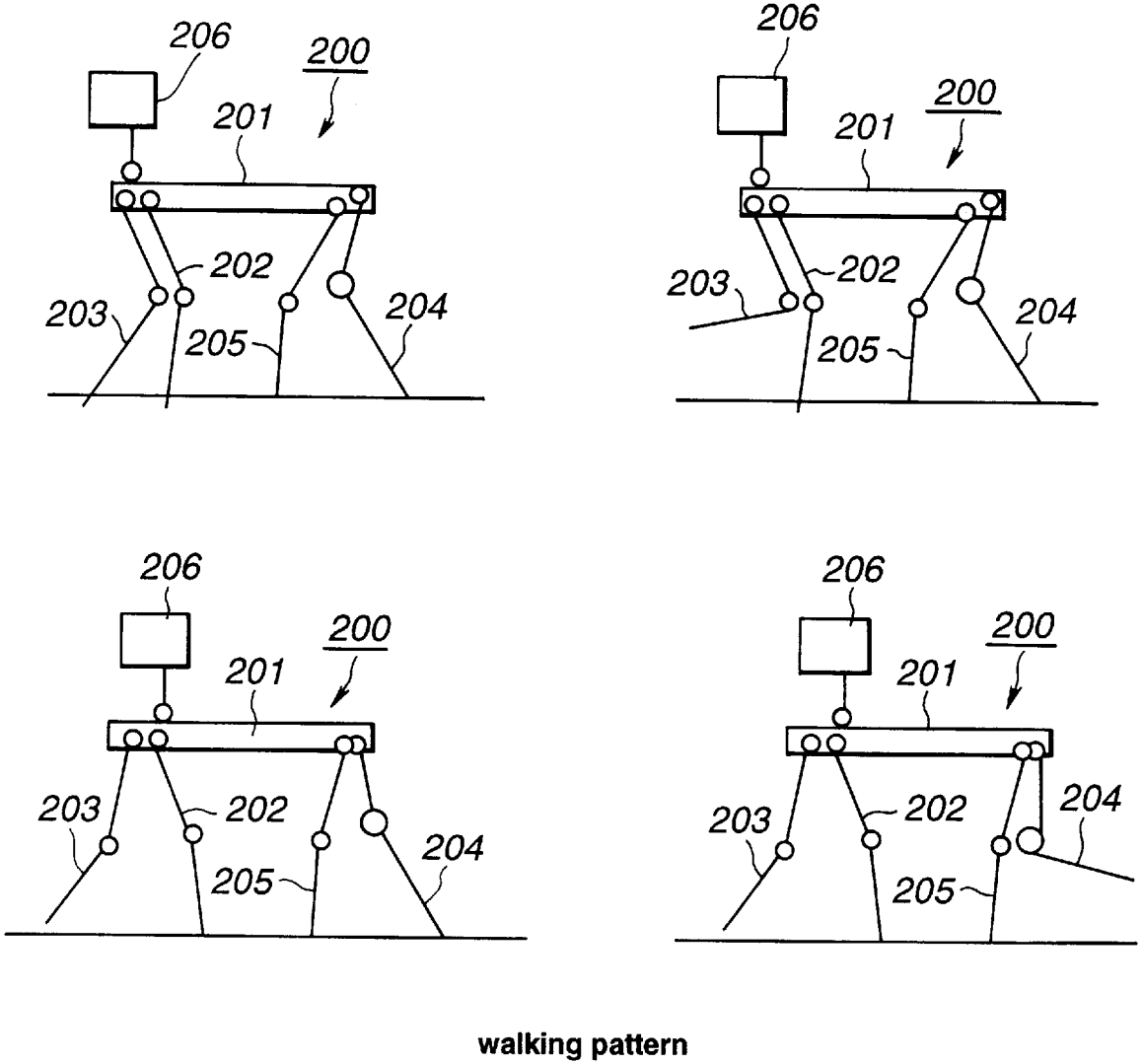
FIG. 9 is a schematic view showing attitude "walking" of the self-standing and quadrapedal walking robot.

Command "move (parameter angle [deg])" which is a command independent from the mechanical system is converted into a control command in the form of an attitude transition string to realize "standing". Specifically, if angle [deg] is a positive value with respect to angle [deg] which is used as a parameter, a control command in the form of an attribute transition string of a forward walking pattern is generated. In accordance with the control command, the control portion 102 rotates the servo motor of the drive portion 103 so as to perform transition to attitude "walking" so that the self-running robot apparatus 200 walks with the four legs which are the front-right leg 202, the front-left leg 203, the rear-right leg 204 and the rear-left leg 205, as shown in FIG. 9.

Figure 10:
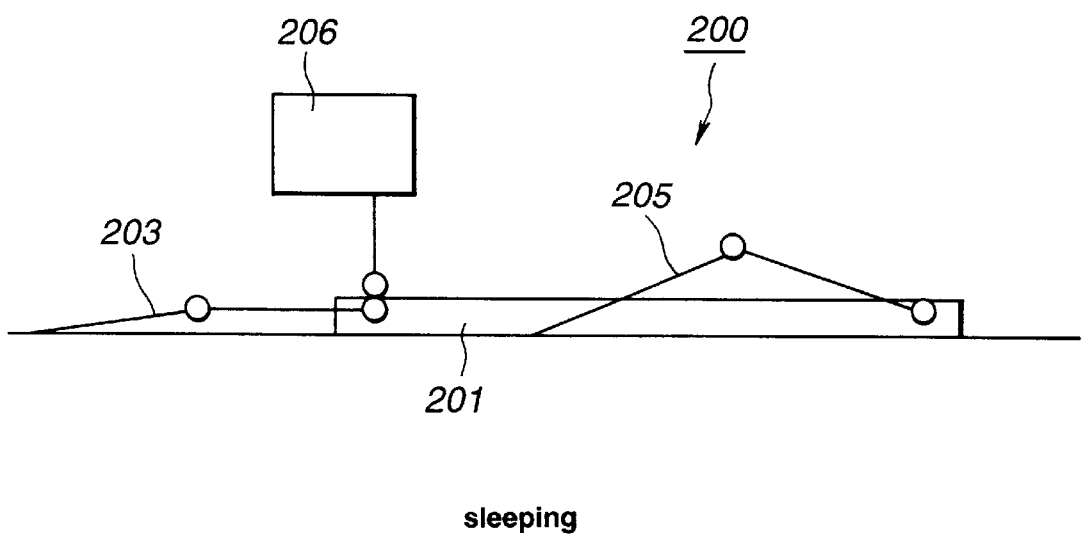
FIG. 10 is a schematic view showing attitude "sleeping" of the self-standing and quadrapedal walking robot.

Command "sleeping" which is a command independent from the mechanical system is converted into a control command in the form of an attitude transition string to realize "sleeping". In accordance with the control command, the control portion 102 rotates the servo motor of the drive portion 103 so as to perform shifting to attitude "sleeping" so that the self-running robot apparatus 200 lies in such a manner that the four legs are stretched which are the front-right leg 202, the front-left leg 203, the rear-right leg 204 and the rear-left leg 205, as shown in FIG. 10.

Figure 11:
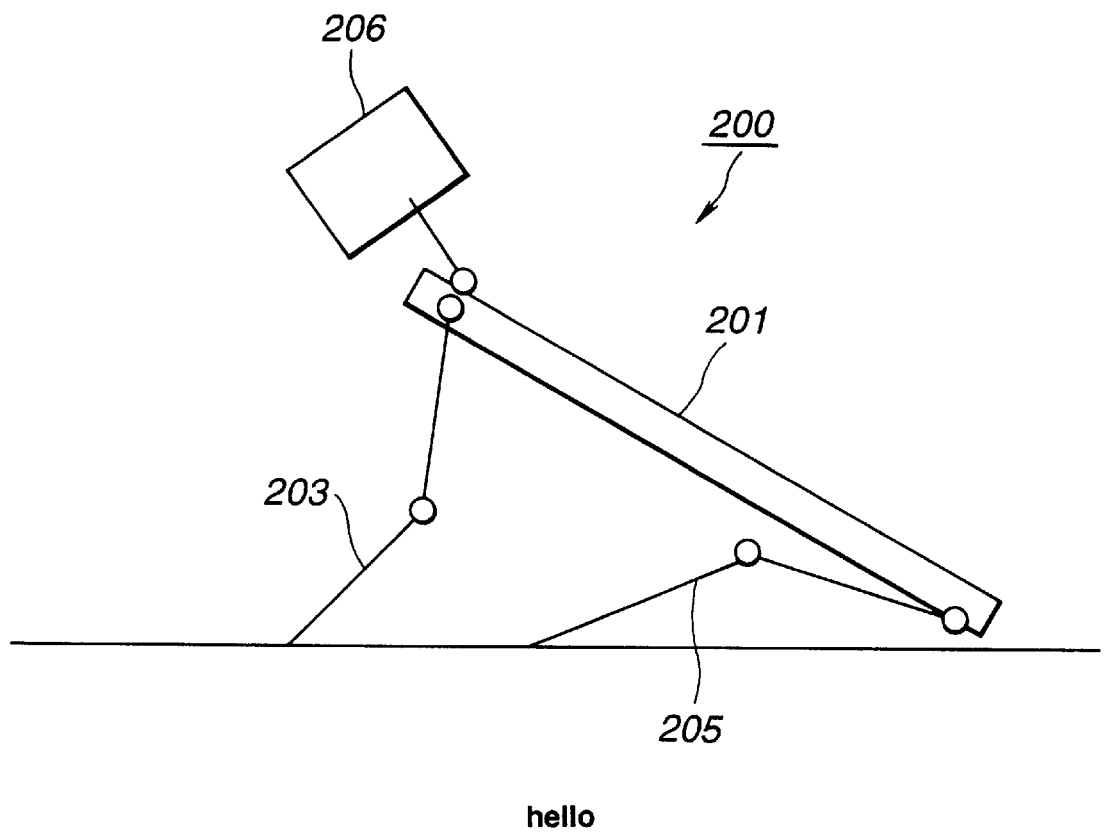
FIG. 11 is a schematic view showing attitude "hello" of the self-standing and quadrapedal walking robot.

Command "hello" which is a command independent from the mechanical system is converted into a control command in the form of an attitude transition string to realize "hello". In accordance with the control command, the control portion 102 rotates the servo motor of the drive portion 103 so as to perform shifting to attitude "hello" so that the self-running robot apparatus 200 makes a bow in a sitting state, as shown in FIG. 11.

Figure 12:
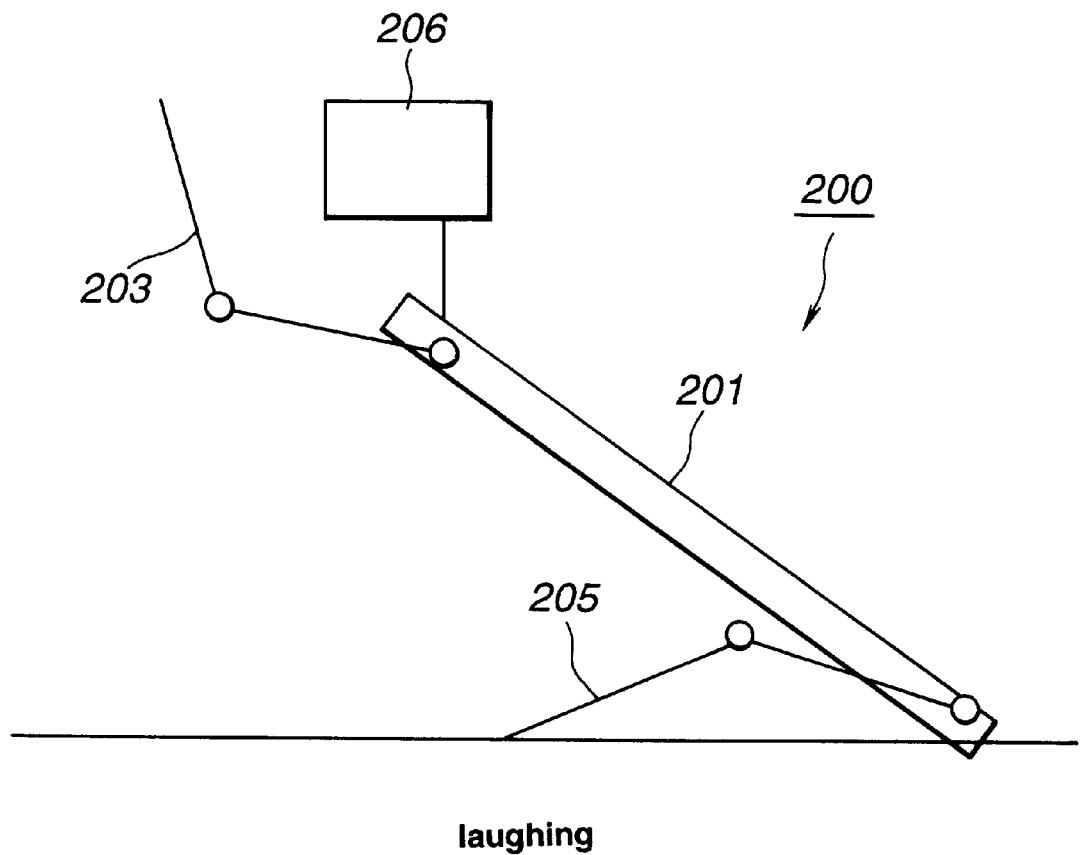
FIG. 12 is a schematic view showing attitude "laughing" of the self-standing and quadrapedal walking robot.

Command "laughing" which is a command independent from the mechanical system is converted into a control command in the form of an attitude transition string to realize "laughing". In accordance with the control command, the control portion 102 rotates the servo motor of the drive portion 103 so as to perform shifting to attitude "laughing" so that the self-running robot apparatus 200 raises the front-right leg 202 and the front-left leg 203 in a sitting state, as shown in FIG. 12.

Figure 13:
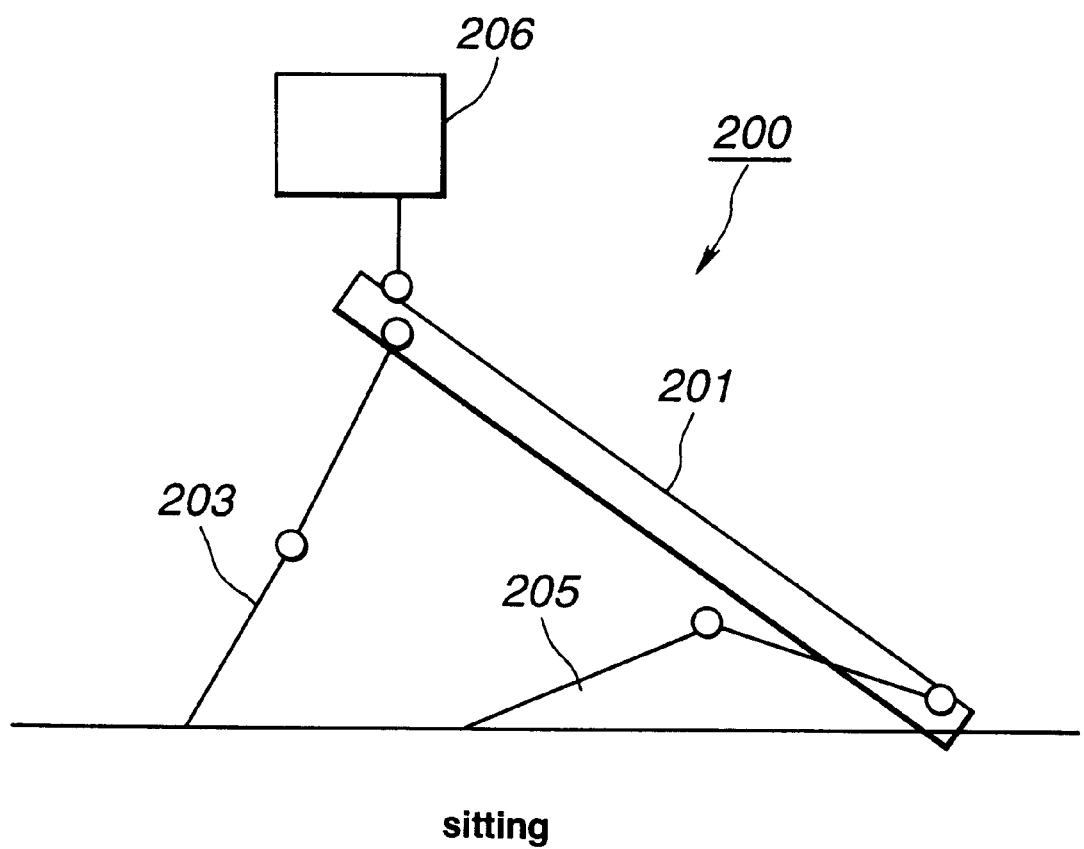
FIG. 13 is a schematic view showing attitude "sitting" of the self-standing and quadrapedal walking robot.
Figure 14:
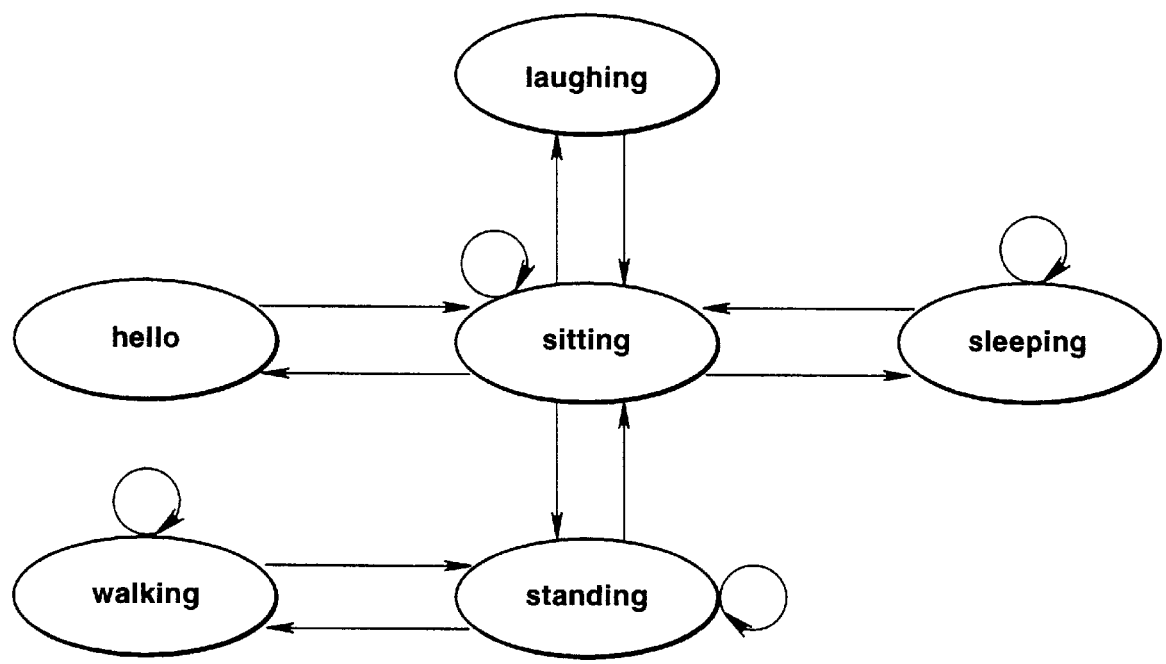
FIG. 14 is a diagram showing a rule for state transition of the self-standing and quadrapedal walking robot.
Figure 15:
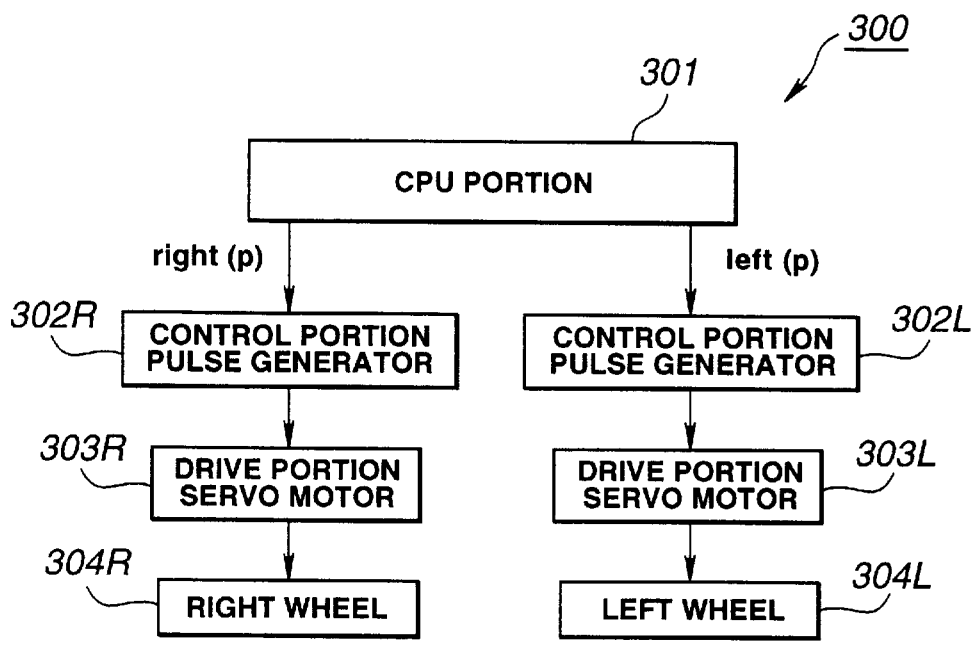
FIG. 15 is a block diagram showing the basic structure of a tired-robot apparatus according to the present invention.

The self-running robot apparatus 200 follows the control command supplied from the CPU portion 101 to the control portion 102, the command having the structure in terms of software as shown in FIG. 2. Thus, the self-running robot apparatus 200 performs attitude transition corresponding to the above-mentioned commands independent from the mechanical system, which are "standing", "move (parameter angle [deg])", "sleeping", "hello" and "laughing". When the attitude transition is performed, a state to which transition cannot directly be performed exists. Therefore, attitude "sitting" as shown in FIG. 13 is defined as an intermediate attitude so that transition to a required attitude is performed through the attitude "sitting". A state of the transition rule is shown in FIG. 14. When transition from attitude "sleeping" to attitude "walking" is performed, an attitude transition string as "sitting"→"standing"→"walking" is, as a control command, supplied from the CPU portion 101 to the control portion 102. FIG. 15 is a block diagram showing the basic structure of a tired-robot apparatus 300 according to the present invention. The tired-robot apparatus 300 includes a CPU portion 301, control portions 302R and 302L, drive portions 303R and 303L and right and left wheels 304R and 304L. When the right and left wheels 304R and 304L are rotated by the drive portions 303R and 303L, the tired-robot apparatus 300 is able to move or rotate.

The drive portions 303R and 303L include servo motors capable of independently rotating the right and left wheels 304R and 304L in the forward and rearward directions.

The control portions 302R and 302L include pulse signal generators to follow control commands issued from the control portions 302R and 302L to control the directions of rotations and rotational speeds of the servo motors of the drive portions 303R and 303L by dint of the relationship of the phases of two pulses and the widths of the pulses.

Figure 16:
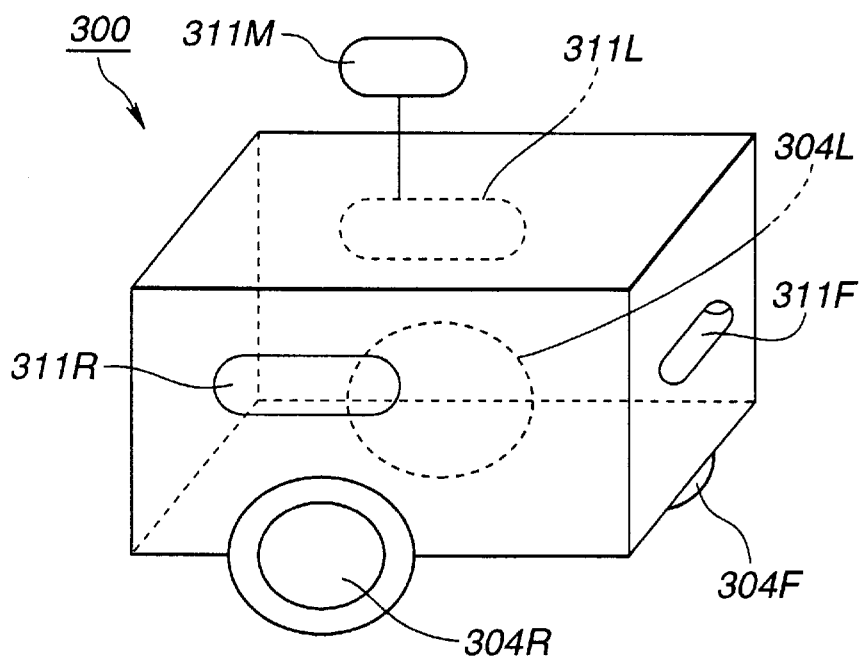
FIG. 16 is a perspective view showing the tired-robot apparatus.

The CPU portion 301 has the structure in terms of software as shown in FIG. 2. As shown in a schematic and perspective view shown in FIG. 16, the tired-robot apparatus 300 has a front caster 304F disposed in the bottom of the front portion of the body of the tired-robot apparatus 300 and right and left wheels 304R and 304L so that the self-standing state of the tired-robot apparatus 300 is maintained. The CPU portion 301 has the input devices for the sensor processing portion 111, the input devices being a front obstacle sensor 311F, a right obstacle sensor 311R and a left obstacle sensor 311L disposed in the front portion, on the right side and the left side of the body of the tired-robot apparatus 300 and a microphone 311M disposed in the upper portion of the body.

A mechanical-system-command converter 113 provided for the CPU portion 301 of the tired-robot apparatus 300 as a software structure converts a command which is independent from the mechanical system and which does not depend on the mechanical system into a command depending on the mechanical system. Thus, the mechanical-system-command converter issues the following commands right (p) and left (p) to the control portions 302R and 302L.

That is, command "standing" which is a command independent from the mechanical system is converted into control commands right (o) and left (o) for interrupting the rotations of the servo motors of the drive portions 303R and 303L. In accordance with the foregoing control commands right (o) and left (o), the control portions 302R and 302L interrupt the servo motors of the drive portions 303R and 303L. Therefore, the tired-robot apparatus 300 is brought to a state of interruption in accordance with the command "standing" which is a command independent from the mechanical system.

Command "move (parameter angle [deg])" which is a command independent from the mechanical system is converted into control commands right (r) and left (l) for rotating the servo motors of the drive portions 303R and 303L in such a manner that the right and left wheels 304R and 304L are rotated at a rotation ratio of r:l determined in accordance with angle [deg]. In accordance with the control commands right (r) and left (l), the control portions 302R and 302L rotate the servo motors of the drive portions 303R and 303L so as to rotate the right and left wheels 304R and 304L at the rotation ratio of r:l determined in accordance with angle [deg]. In accordance with the command "move (parameter angle [deg]" which is a command independent from the mechanical system, the tired-robot apparatus 300 is brought to a state of movement into a direction instructed with angle [deg].

Command "sleeping" which is a command independent from the mechanical system is converted into control commands right (o) and left (o) for interrupting the rotations of the servo motors of the drive portions 303R and 303L. In accordance with the control commands right (o) and left (o), the control portions 302R and 302L interrupt the rotations of the servo motors of the drive portions 303R and 303L. Therefore, the tired-robot apparatus 300 is brought to a state of interruption in accordance with the command "sleeping" which is a command independent from the mechanical system.

Command "hello" which is a command independent from the mechanical system is converted into control commands right (−x) and left (+x) for rotating the servo motors of the drive portions 303R and 303L in such a manner that the right wheel 304R is rotated rearwards three times and the left wheel 304L is rotated forwards three times. In accordance with the control commands right (−x) and left (+x), the control portions 302R and 302L rotates the servo motors of the drive portions 303R and 303L. Thus, the right wheel 304R is rotated rearwards three times and the left wheel 304L is rotated forwards three times. Therefore, the tired-robot apparatus 300 rotates clockwise three times on the spot and then stops in accordance with the command "hello" which is a command independent from the mechanical system.

Command "laughing" which is a command independent from the mechanical system is converted into control commands right (o) and left (+x) for interrupting the rotations of the servo motor of the drive portion 303R and rotating the servo motor of the drive portion 303L in such a manner that the left wheel 304L is rotated forwards three times in a state in which the right wheel 304R is stopped. In accordance with the control commands right (o) and left (+x), the control portions 302R and 302L interrupt the rotation of the servo motor of the drive portion 303R and rotates the servo motor of the drive portion 303L. Thus, the left wheel 304L is forwards rotated three times in the state in which the right wheel 304R is stopped. Therefore, the tired-robot apparatus 300 performs an operation in accordance with the command "laughing" which is a command independent from the mechanical system in such a manner that the tired-robot apparatus 300 rotates clockwise three times relative to the stopped right wheel 304R.

The control commands right (p) and left (p) which are supplied from the CPU portion 301 to the control portions 302R and 302L indicate the following facts.

That is, the control command right (p) causes drive pulses each having a pulse width of p to be transmitted to the servo motor of the drive portion 303R for rotating the right wheel 304R. If p is a positive value, forward rotations are performed. If p is a negative value, rearward rotations are performed.

The control command left (p) causes drive pulses each having a pulse width of p to be transmitted to the servo motor of the drive portion 303L for rotating the left wheel 304L. If p is a positive value, forward rotations are performed. If p is a negative value, rearward rotations are performed.

Figure 17:
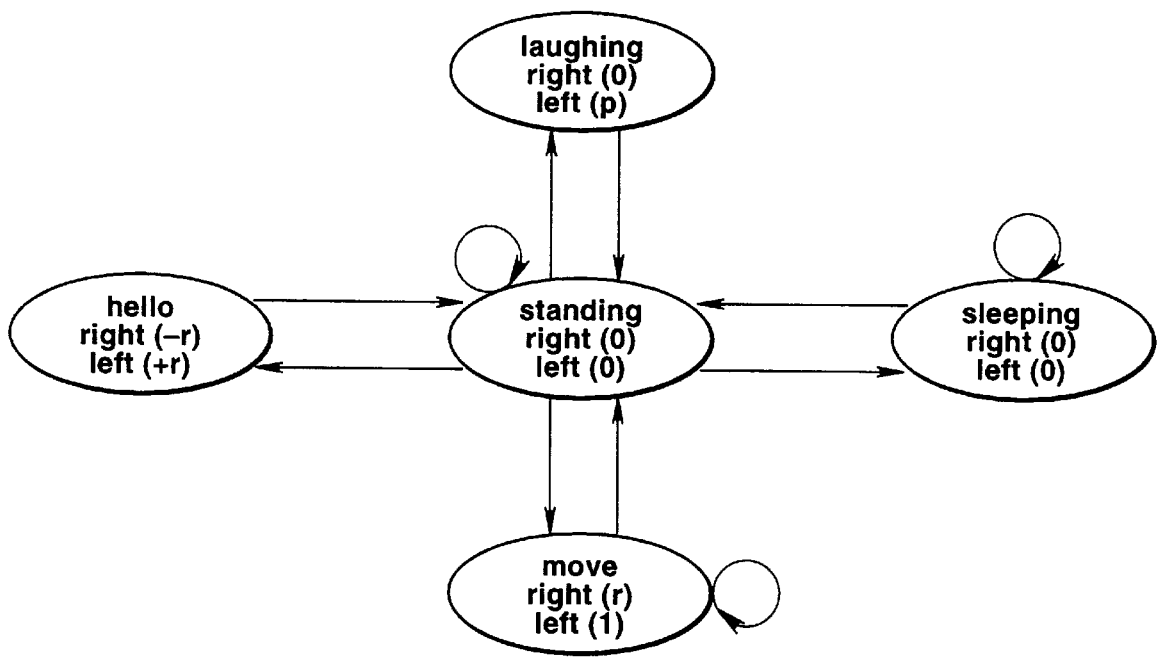
FIG. 17 is a diagram showing an attitude transition state of the tired-robot apparatus.

The tired-robot apparatus 300 is permitted to perform the transition of the attitude to any one of the attitudes corresponding to the commands "standing", "move (parameter angle [deg]", "sleeping", "hello" and "laughing" which are commands independent from the mechanical system. Although the attitude transition for the tired-robot apparatus 300 is not limited particularly, the transition must be performed through the attitude "standing (right (o) and left (o)), as shown in FIG. 17.

As described above, the robot apparatus according to the present invention has the mechanical-system-command converter for converting a command independent from the mechanical system into a command depending on the mechanical system. Thus, an operation corresponding to the command independent from the mechanical system can be performed by the mechanical system. For example, the mechanical-system-command converter converts a command independent from the mechanical system into a command depending on the mechanical system adaptable to the mechanical system and formed by an attitude transition string. Thus, the operation of a drive portion of a mechanical system which stands with legs can be controlled by the control portion. Moreover, the mechanical-system-command converter converts a command independent from the mechanical system into a command depending on the mechanical system for controlling rotations to be adaptable to the mechanical system. Thus, control of the operation of a drive portion of a mechanical system having wheels for permitting self-running can be performed by the control portion.

That is, the same command is made to correspond to different operations among the mechanical systems. Thus, the mechanical-system-command converter enables higher-order software to be used as a source code or a binary level. Therefore, use of software as part can be enhanced and software in a portion which does not depend on the mechanical system can be reused. As a result, development of software can efficiently be performed.

Therefore, the present invention is able to provide a robot apparatus of various forms having mechanical systems of different types arranged to use a command, which is independent from a mechanical system and which does not depend on the mechanical system, and enabled to be controlled by a common control system and to a control method therefor. Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A robot comprising:

a mechanical system having at least one mechanical portion arranged to be operated by a drive portion, said mechanical system being a changeable mechanical system in which different types of parts of said robot are interchangeable with one another;

a mechanical-system-command converter arranged to receive a mechanical-system-independent command and to convert the received command into a command depending on and adaptable to a current mechanical system defined by the types of parts connected thereto; and a control portion for controlling the operation of the drive portion in accordance with the command depending on the mechanical system supplied from said mechanical-system-command converter.

2. A robot according to claim 1, wherein said mechanical-system-command converter converts a command independent from the mechanical system into a command depending on the mechanical system in the form of an attitude transition string adapted to the mechanical system.

3. A robot according to claim 2, further comprising a mechanical system having legs for permitting self-standing of said robot apparatus, wherein said control portion follows a command depending on the mechanical system corresponding to a command independent from the mechanical system supplied from said mechanical-system-command converter and in the form of an attitude transition string to control the operation of the drive portion of the mechanical system.

4. A robot according to claim 1, wherein said mechanical-system-command converter converts a command independent from the mechanical system into a command depending on the mechanical system for controlling rotations adaptable to the mechanical system.

5. A robot according to claim 4, further comprising a mechanical system which permits self-running of said robot apparatus when wheels are rotated, wherein said control portion follows a command depending on the mechanical system for controlling rotations to correspond to a command independent from the mechanical system supplied from said mechanical-system-command converter to control the operation of the drive portion of the mechanical system.

6. A robot according to claim 1 wherein said changeable mechanical system is selectably changeable from/to a mechanical system with wheels to/from a mechanical system with legs.

7. A method of controlling a robot including a mechanical system having at least one mechanical portion arranged to be operated by a drive portion, said mechanical system being a changeable mechanical system in which different types of parts of said robot are interchangeable with one another, said method comprising the steps of:

converting, by said robot, a mechanical-system-independent command into a command depending on and adapted to a current mechanical system defined by the types of parts connected thereto; and controlling the drive portion in accordance with the command depending on the mechanical system.

8. A method of controlling a robot according to claim 7, wherein the command independent from the mechanical system is converted into a command depending on the mechanical system and formed into an attitude transition string adapted to the mechanical system to control the drive portion of the mechanical system.

9. A method of controlling a robot according to claim 7, wherein a command independent from the mechanical system is converted into a command depending on the mechanical system for controlling rotations to be adaptable to the mechanical system so that the operation of a drive portion of a mechanical system for permitting self-running when wheels are rotated is controlled.

10. A method according to claim 7 wherein said changeable mechanical system is selectably changeable from/to a mechanical system with wheels to/from a mechanical system with legs.

* * * * *